United States Patent [19]
Hjermstad et al.

[11] 3,730,005
[45] May 1, 1973

[54] ELECTROMECHANICAL ACTUATOR

[75] Inventors: Hans U. Hjermstad, Chicago; Carl J. Kopp, Arlington Heights, both of Ill.

[73] Assignee: C. P. Clare & Co., Chicago, Ill.

[22] Filed: Dec. 20, 1971

[21] Appl. No.: 209,896

[52] U.S. Cl. ............................................. 74/2, 89/1.5
[51] Int. Cl. ................................................. G05g 17/00
[58] Field of Search ................................ 74/2; 89/1.5

[56] References Cited

UNITED STATES PATENTS 2,776,570  1/1957  Nelson et al. .............................. 74/2

*Primary Examiner*—Milton Kaufman
*Attorney*—Melvin F. Jager

[57] ABSTRACT

An energy-storing and release mechanism usable to actuate bomb shackle release devices and the like. The mechanism includes a plunger capable of forcibly moving from a cocked position to a released position in response to a control signal from actuating means. Locking means are provided to respond to the actuating means and to releasably lock the plunger in the cocked position to prevent accidental release of the plunger as a result of shock loads having a substantial rotational force component.

10 Claims, 7 Drawing Figures

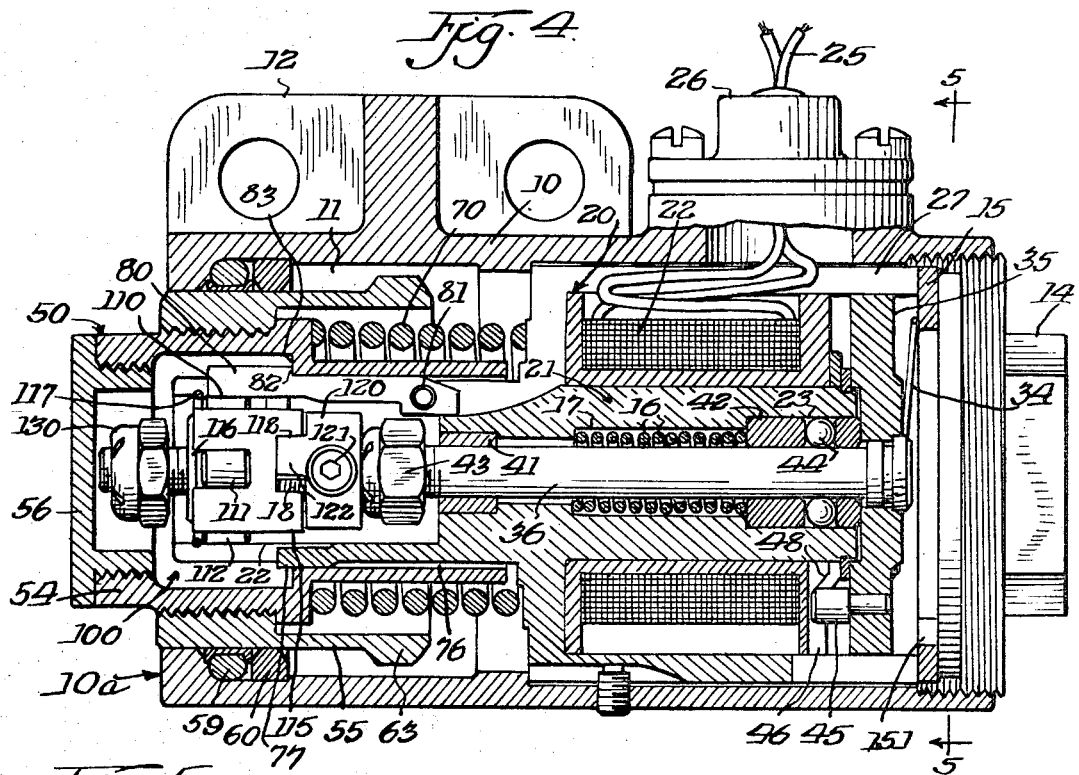
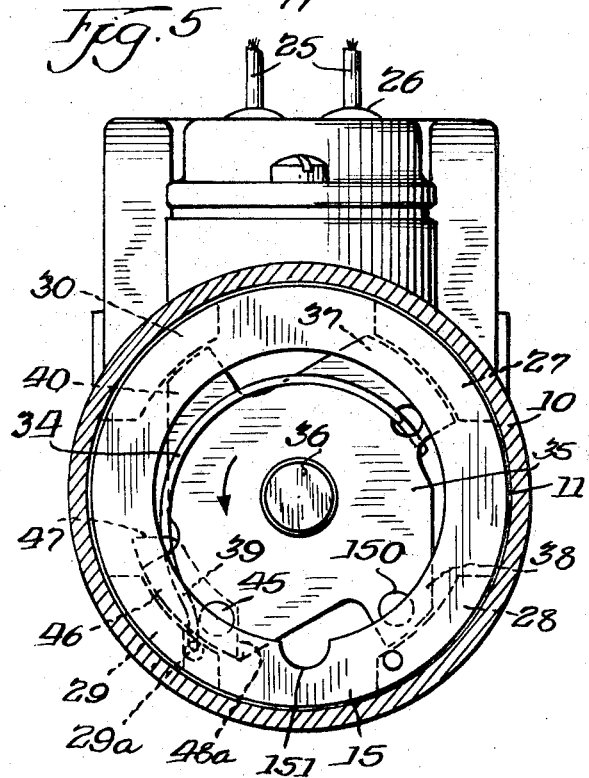
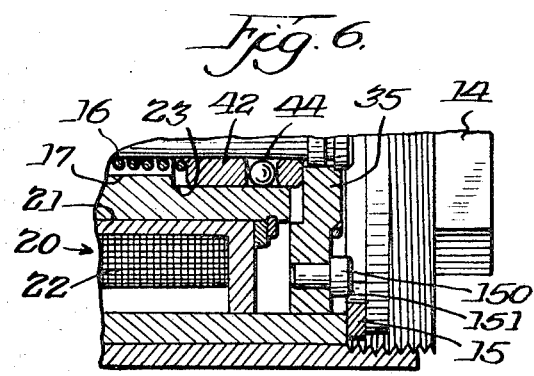
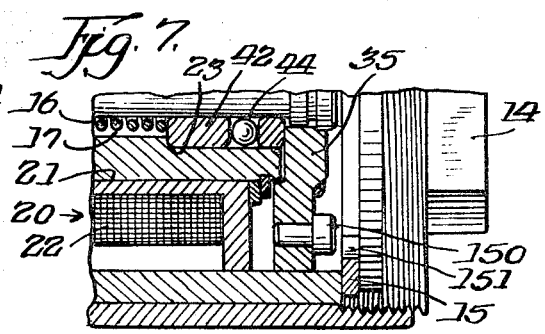

ELECTROMECHANICAL ACTUATOR

BACKGROUND AND GENERAL DESCRIPTION OF THE INVENTION

This invention relates generally to an electromechanical energy storing and release mechanism, and more particularly relates to an improved actuator mechanism of the type disclosed in U.S. Pat. No. 3,364,752 for controlling a bomb shackle release device.

As set forth in the above-mentioned patent, actuator mechanisms for controlling aircraft bomb release devices must meet very rigid design and operating standards before being adapted for use under adverse field conditions. The limited supply of electrical power available on the aircraft, and the movement of the aircraft in all directions under extreme circumstances, requires the actuator to be operable under severe field conditions when energized by a relatively small amount of electrical energy. The actuator also must be designed to be compact and lightweight, to be easily and economically assembled, and must be capable of withstanding severe temperature and vibration conditions.

The actuator described and claimed in U.S. Pat. No. 3,364,752, assigned to the same assignee as this invention, has been very successful in meeting the above-mentioned structural and operational requirements. The purpose of this invention is to improve that actuator to guard against premature release of the actuator when it is subjected to unusual shock loads having a substantial rotational force component. Although such accidental release is very unlikely, the results of a premature operation of a bomb shackle device are so severe that even a remote possibility of danger should be eliminated, when possible.

Accordingly, the object of this invention to prevent premature release of an actuator mechanism is accomplished with an actuator design which incorporates an automatic locking mechanism. The locking mechanism functions to retain the actuator in a cocked position under the most severe loading conditions, and is released by the actuation of the mechanism by an electrical signal or the like. After the locking mechanism is released, the actuator functions in its usual manner to release a bomb shackle.

Briefly described, this invention contemplates on energy-storing and release mechanism having a movable plunger. An energy-storing means, such as a coil spring, is arranged to rapidly drive the plunger from a cocked position to a released position. Latching means are engageable with the plunger to releasably retain the plunger in its cocked position until the actuator is energized. A shaft assembly is rotatable between selected first and second positions. Cam means joined to the shaft operate in the first position of the shaft to retain the latching means in engagement with the plunger. In the second position of the shaft, the cam means releases the latching means and permits the energy-storing means to rapidly move the plunger toward its released position. Locking means in accordance with this invention are arranged to releasably lock the shaft in its first position, and thereby lock the latching means in engagement with the plunger. The locking means thus prevents accidental release of the plunger from the cocked position. Actuating means sequentially release the locking means and rotate the shaft from the first to the second position. The actuating means thereby unlock the plunger and cause the cam means to release the latching means, and permit the energy-storing means to drive the plunger.

EXEMPLARY EMBODIMENT

Further objects and features of the present invention will become apparent from a description of an exemplary embodiment thereof, taken in conjunction with the accompanying drawings. In the drawings:

FIG. 4 is a longitudinal sectional view of the actuator mechanism illustrated in a cocked and unlocked position, prior to firing;

FIG. 5 is a cross-sectional end view of the unlocked and fired actuator mechanism, as viewed along the line 5—5 in FIG. 4;

FIG. 6 is an enlarged and removed sectional view of the actuator mechanism, illustrating the locking components in a locked position; and FIG. 7 is an enlarged and removed sectional view of the actuator mechanism, illustrating the locking components in an unlocked position.

Figure 1:
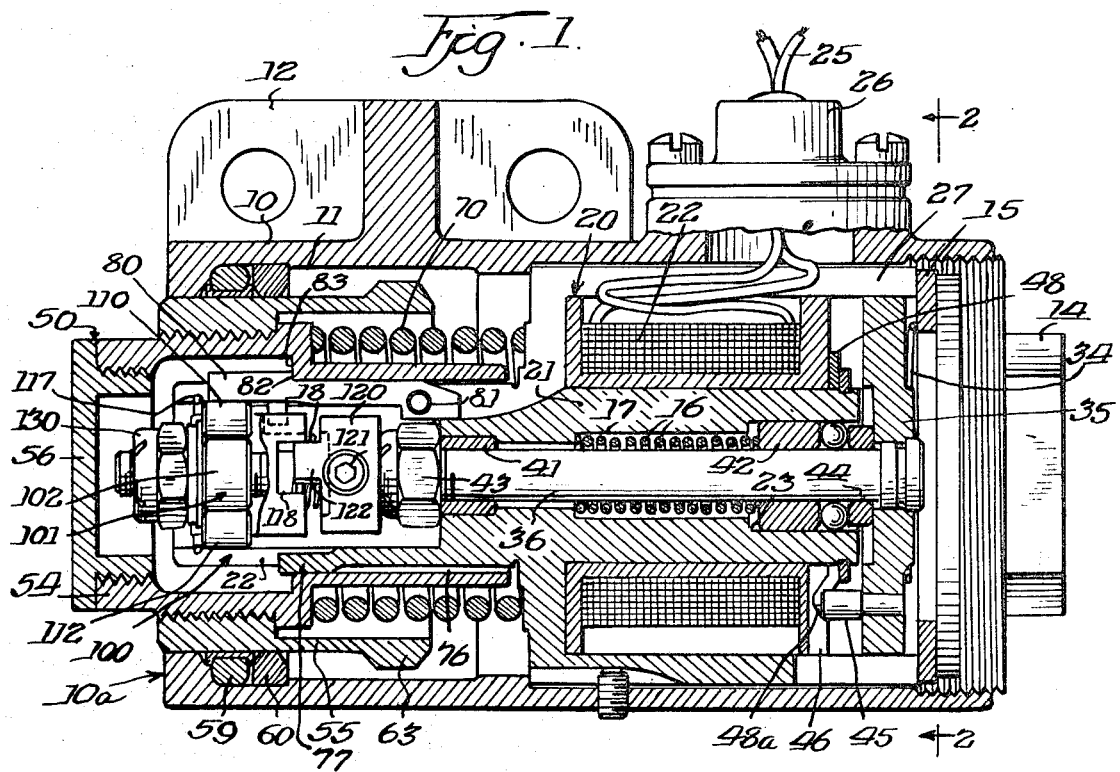
FIG. 1 is a longitudinal sectional view of an assembled actuator mechanism having the features and advantages of the present invention shown in a cocked and locked position.

Referring generally to the drawings, the actuator mechanism in accordance with this invention is generally identified by the reference numeral 10.

The actuator 10 includes a hollow housing 11 and a support bracket 12 for securing the assembly in the proper position adjacent a bomb release shackle (not shown). A suitable plug 14 and spacer washer 15 are located at one end of the actuator, to maintain the actuator components in their proper position within housing 11, and to seal the end of the housing from moisture, dirt, and the severe temperature variations of the surrounding atmosphere. The housing 11, the plug 14 and washer 15, are preferably made from a metal having a high magnetic reluctance.

The actuator 10 also includes an electro-magnetic solenoid 20 housed at the end of the chamber adjacent the plug 14. A spring-loaded plunger assembly 50 is housed at the opposite end of the housing 11. As explained in U.S. Pat. No. 3,364,752, the solenoid 20, when energized, operates to release the spring-loaded plunger assembly 50 and allow the plunger to forcibly impact a bomb shackle release lever.

As illustrated in FIGS. 1 and 4, the solenoid 20 includes a cylindrical stator core 21 surrounded by an energizing coil 22. The plunger assembly 50 is coaxially arranged with the stator 21. The end of the stator 21 adjacent plug 14 includes a hollow cylindrical portion surrounding the core 22 which projects axially beyond the core, to the right in FIGS. 1 and 4. This cylindrical projection of the core 21 is shaped to provide four spaced magnetic field in the pole pieces 27–30, through the application of an electrical current to the lead wires 25 which extend into the housing 11 through a watertight fitting 26.

The solenoid 20 also includes a rotatable rotor assembly 35. The rotor 35 is spaced adjacent the plug 14 inside the stator pole pieces 27, 28, 29 and 30. The rotor 35 defines four equally spaced rotor poles 37, 38, 39 and 40, as clearly illustrated in FIGS. 2 and 5. These rotor poles 37–40 are disposed adjacent the stator pole pieces 27–30, respectively, so that the energization of the solenoid 20 causes the rotor poles to be attracted toward the respective adjacent stator pole pieces. As fully described in the aforementioned patent, the energization of the solenoid 20 thereby imparts a counterclockwise rotation to the rotor 35, as indicated by the arrows in FIGS. 2 and 5.

The actuator 10 also includes a rotor shaft 36. The shaft 36 is fixed at one end to the rotor 35, and extends axially for substantially the entire length of the housing 10. Suitable sleeve bearings 41 and 42 mount the shaft 36 within the stator 21, and permit the shaft to rotate freely within the housing 10. A stop nut 43 and a thrust ball bearing 44 are provided to control the lateral positioning of the shaft 36, and the connected rotor 35. As illustrated in FIG. 1, the stop nut 43 engages with the adjacent end of the stator 21 to limit the translation of the shaft 36 within the stator.

In accordance with this invention, the stator 21 includes a cylindrical bearing block 23 machined in the stator at the end adjacent the rotor 35. The sleeve bearing 42 and the thrust bearing 44 are slidably positioned within the bearing block 23. Accordingly, the rotor 35, and the shaft 36 are free to rotate and translate with respect to the stator 21. The depth of the bearing block 23 defines the limit of travel of the shaft in one longitudinal direction (to the left in FIG. 1 ). The stop nut 43 can be adjusted to define the extent of longitudinal travel of the shaft 36 in the opposite direction to the right.

The actuator 10 also includes a stop pin 45 connected to the rotor 35. The stop pin 45, as indicated in FIGS. 1 and 4, extends inwardly from the rotor toward the stator 21. The pin 45 travels within an arcuate groove 46 cut in the stator 21. The upper limit of the groove 46 provides an abutment shoulder 47 which is engageable with the pin 45 to define the extreme clockwise or cocked position of the rotor 35. A torsion spring 34 is coupled between the rotor 35 and the hole 29a in stator pole 29, and is arranged to constantly urge the rotor 35 clockwise toward its cocked position. As illustrated in FIGS. 1 and 5, the stator 21 also includes a washer ring 48 including a tab projection 48a. The tab 48a extends downwardly into the path of the pin 45 and is engageable with the pin 45 to define the extreme counterclockwise uncocked or released position of the rotor 35.

The plunger assembly 50 comprises a hollow cylindrical member 54 which is slidably extended over the stator 21 and the adjacent end of the rotor shaft 36 and an outer hollow cylindrical member 55. The outer end of the cylindrical member 54 is provided with a striking cap 56 which will engage the release lever of the bomb shackle release device when the plunger assembly 50 is actuated. To limit the outward travel of the plunger assembly 50, the housing 10 includes an inwardly extending flange 10a. The flange 10a includes a sealing ring 59 and a split shock ring 60. An angular flange 63 provided on the inner end of the plunger member 55 will engage the shock ring 60 to compress the sealing ring 59 and simultanesouly stop the outward or leftward movement of the plunger assembly 50.

The actuator assembly 10 also includes energy-storing means in the form of a strong compression spring 70. The spring 70 is fully compressed when the actuator is in a locked and cocked position, as illustrated in FIG. 1. The spring 70 releases its energy and forcefully moves the plunger assembly 50 outwardly, to the left in FIG. 1, when the plunger is unlatched by activation of the actuator 10. The plunger 50 will thereby impact the bomb shackle release device. As shown in FIG. 1, the spring 70 is mounted around the adjacent cylindrical portion of the stator 21, and is compressed between the stator 21 and a suitable flange portion provided on the plunger assembly 50. A keyway 76 together with a key 77 defined on the stator 21 guide the outward movement of the plunger 50 in response to the release of the energy in the compression spring 70.

Figure 3:
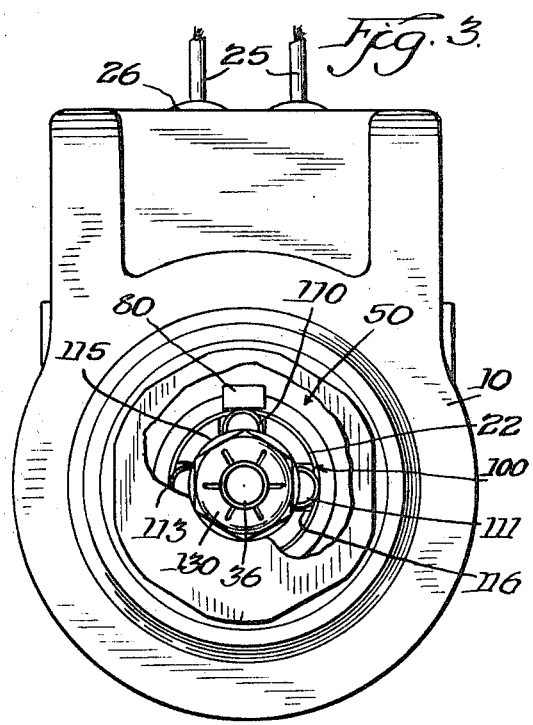
FIG. 3 is an elevational view of the other end of the actuator mechanism, shown in partial section.

The actuator mechanism 10 further includes a locking and release latch 80, as illustrated in FIGS. 1, 3 and 4. The latch 80 operates to retain the plunger assembly 50 in a cocked energy-storing position. The latch is pivotally mounted to the housing 10 adjacent the plunger assembly 50 on pin 81. A detent 82 on the latch is engageable with an interior surface 83 on the plunger assembly 50. As described in U.S. Pat. No. 3,364,752, the plunger assembly 50 is thereby releasably retained in an inward cocked position with the housing 10.

The actuator 10 in accordance with this invention also includes a planetary cam system 100 for releasably retaining the latch 80 in a latched position against the plunger assembly 50. As illustrated in FIGS. 1, 3 and 4, the cam system 100 includes a cylindrical cam sleeve 101 defining an arcuate cam surface 102 on its periphery, and a plurality of rolling cams 110, 111, 112, and 113. These rolling cams are uniformly spaced around the cam surface 102 and are loosely held with slots 116 in a roller spider member 115. A tubular extension 22 of the stator 21 forms an outer raceway for the roller cams 111, 112, and 113. As illustrated in FIG. 3, the top roller cam 110 projects upwardly through the tubular portion 22, and is free to engage with the latch mechanism 80.

The cam assembly 100 is connected to the rotor shaft 36 so that the rotary movement of the shaft controls the movement of the cam assembly, and thereby moves the latch 80 between a latched position and a released position. In order to position the cam assembly 100 on the shaft 36 in the proper longitudinal location, the cam assembly 100 includes a retaining washer 117. An adjustable nut 130, threadably engages the adjacent end of the shaft 36 and will maintain the cam assembly 100 on the shaft 36 during the assembly operation. The retaining washer 117, as illustrated in FIG. 1, extends into an adjacent groove provided in the cam spider 115 to retain the cam rollers 110, 111, 112, and 113 from shifting laterally with respect to the cam spider. The cam spider 115 and the associated roller cams are rotatable with respect to the shaft 36.

The cam assembly 100 also includes a cam nut 120 on the right end of the cam assembly. As seen in FIGS. 1 and 4, the cam nut 120 is secured to the shaft 36 by a set screw 121. The cam nut 120 will thereby rotate in response to the rotation of the rotor 35 and the rotor shaft 36. Projecting tongues 122 on the cam nut 120 operably engage with corresponding recessed longitudinal grooves 118 on the cam spider 115. The rotation of the shaft 36 is thereby transmitted to the cam spider 115 and the cam rollers 110–113 by the engagement between the tongues 122 and the grooves 118.

The arcuate width of the grooves 118 in the spider 115 is selected to be substantially larger than the width of the tongues 122, so that the rotation of the shaft 36 causes the tongues to travel through a pre-determined arc before engaging with the spider 115. As explained in U.S. Pat. No. 3,345,752, this pre-travel feature permits the latch 80 to be unlocked with a substantial torque force during the operation of the actuator mechanism in accordance with this invention.

Furthermore, the longitudinal or axial lengths of the tongues 122 and the corresponding grooves 118 are selected so that the rotor 35, the rotor shaft 36, and the attached cam nut 120 can travel longitudinally a selected distance without disengaging the cam nut 120 from the cam spider 115. A compression spring 18 is positioned around the shaft 36 between the nut 120 and the spider 115. The spring 18 constantly urges the spider 115 and the associated cam rollers 110–115 outwardly against the retaining ring 117, to maintain the lateral position of the spider and the cam rollers with respect to the latch 80.

Figure 2:
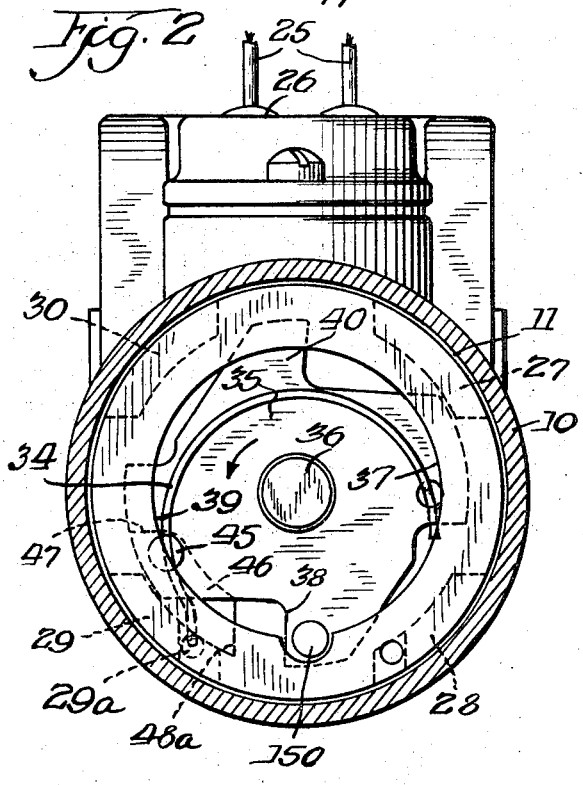
FIG. 2 is a cross-sectional view of one end of the locked actuator mechanism, as viewed along the line 2—2 in FIG. 1.

The operation of the cam assembly 100 to actuate the plunger assembly 50 is fully described in U.S. Pat. No. 3,345,752. Generally, the actuator 10 is initially retained by the latch 80 in a cocked energy-storing position, as illustrated in FIG. 1. In this condition, the solenoid unit 20 is de-energized and the force of the torsion spring 34 retains the rotor 35 in a position with the stop pin 45 engaged against the shoulder 47, as illustrated in FIG. 2. Thus, the pole pieces on the rotor 35 are initially spaced from the pole pieces on the stator 21, (FIG. 2). In this cocked position, the shaft 36, the associated cam nut 120, and spider 115 operate to maintain the upper cam roller 110 in a latching position beneath the latch 80, as shown in FIG. 3.

To release the plunger assembly 50 from its cocked position, a low level energizing current is supplied to the solenoid coil 22 through the leads 25. The energization of the solenoid 20 rotates the rotor 35 and the shaft 36 by attracting the rotor pole pieces 37, 38, 39 and 40 toward the stationary stator pole pieces 27, 28, 29, and 30, respectively. The magnetic force created by the solenoid overcomes the torsional force of the spring 34, and thereby rotates the rotor 35, the shaft 36 and the cam nut 120. After travelling through a selected arc, the tongues 122 in the cam nut will engage with the grooves 118, on the spider 115 and thereby rotate the spider assembly rotation of the shaft 36. The rotation of the shaft 36 and the attached components is finally arrested by the engagement of the stop pin 45 with the tab 48a, as illustrated in FIG. 5.

The rotation of the cam spider 115 induced by the rotation of the shaft 36 rolls the cam roller 110 out of position from beneath the latch 80. Because of the location of the pivot pin 81, the removal of the support roller 110 permits the force of the compressed spring 70 to rotate the latch 80 downwardly out of engagement with the plunger 50. The energy of the fully coiled spring 70 is thereby released to drive the plunger assembly 50 forcefully against a bomb shackle release lever (not shown).

To re-cock the actuator 10, the plunger assembly 50 is urged inwardly by any suitable means, until the spring 70 is fully compressed. As soon as the interior face 83 on the plunger 50 clears the detent 82 on the latch 80, the torsion spring 34 will rotate the shaft 36 and the rolling cams 110 clockwise, and thereby raise the latch 80 into a locked position against the plunger assembly 50. The actuator assembly is thus returned to an energy-storing condition, for a repetition of the above-described actuating cycle.

In accordance with this invention, the actuator 10 incorporates a locking system which locks the actuator in a cocked condition and prevents a premature release of the plunger 50. Accordingly, the locking system includes a locking pin 150 which is positioned on the rotor pole piece 38. The adjacent portion of the stationary retaining ring 15 includes a locking notch 151. As clearly seen in FIGS. 2, 5 and 6, the locking notch 151 is positioned to receive the locking pin 150 when the rotor 35 and the associated shaft 36 are in an energy-storing cocked position. The engagement between the pin 150 and notch 151 precludes rotation of the rotor 35 and the shaft 36, thus releasably locking the latch 80 upwardly against the plunger 50. A locking spring 16 is positioned within a recess 17 in the stator 21, as seen in FIGS. 1 and 4, and operates to forcefully urge the rotor 35 and shaft 36 axially to the right in the drawings. The force of compression spring 16 is supplemented by the compressive force of the spring 18 between the spider 115 and the cam nut 120. The total biasing force of the springs 18 and 16 operate to retain the rotor 35 in an extreme outward or rightward position, as determined by the adjustable spacing nut 43. This position is selected so that the springs 16 and 18 forcefully retain the locking pin 150 within the locking notch 151 after the actuator assembly has been cocked. Thus, in accordance with this invention, an unexpected shock load having a substantial rotational force component will not be able to rotate the rotor 35 and the shaft 36 from the cocked position and the danger of an accidental release of the loaded plunger assembly 50 is substantially reduced.

The locking system including the locking pin 150 simultaneously permits the normal operation of the actuator 10. This is accomplished because the energization of the coil 22 permits the solenoid 20 to sequentially unlock the locking system and then actuate the cam release mechanism 100. Due to the above-described construction of the actuator 10, the force of the spring 16 and 18 maintain a clear air gap between the stator 21 and the rotor 35 when the actuator is positioned in its cocked condition, as shown in FIG. 1. Thus, upon the energization of solenoid coil 22, the initial effect of the magnetic field created by the coil is to close the air gap and draw the rotor 35 axially to the left in FIGS. 1 and 4. This longitudinal or axial movement of the rotor 35 and the shaft 36 is completed before there is any rotational movement. The longitudinal dimension of the tongues 122 and the grooves 118 permit the rotor 35 and the shaft 36 to slide axially in response to the coil energization without moving the cam spider 115. The cam roller 110 therefore remains positioned below the latch 80, and the latch 80 maintains the plunger 50 in a latched condition, during this initial axial movement. This initial movement of the rotor 35 slides the locking pin 150 axially and removes the pin from the locking notch 151 into a released position, as illustrated in FIG. 7.

After the locking pin 150 is thereby released, the continued energization of the solenoid 20 attracts the rotor pole pieces toward the stator pole pieces as described above, and induces the rotational movement of the rotor 35 and the shaft 36. The movement of the shaft 36 is, in turn, transmitted to the cam spider 115 and the roller 110 through the cam nut 120. The roller 110 is thus removed from beneath the latch 80, and the plunger assembly 50 is released. The locking assembly in accordance with this invention therefore permits a simple but effective mechanism to lock the actuator 10 against accidental release.

It is to be understood that various modifications can be made to the disclosed mechanical actuator without departing from the scope of the invention, and it is intended to cover in the appended claims all such modifications as fall within the true spirit and scope of the invention.

what is claimed is:

1. An energy storing and release mechanism comprising:
    a plunger movable from an energy storing cocked position to a released position;
    energy storing means operable to move said plunger from said cocked to said released position;
    latching means engageable with said plunger to releasably retain said plunger in said cocked position;
    a shaft mounted adjacent said plunger and rotatable between selected first and second position;
    cam means joined to said shaft and operable in a latched position to releasably retain said latching means in engagement with said plunger with said shaft in said first position and further operable to release said latching means as said shaft rotates toward said second position;
    locking means arranged to releasably lock said shaft in said first position and thereby lock said latching means in engagement with said plunger to prevent accidental release of said plunger from said cocked position; and
    actuating means to sequentially release said locking means and rotate said shaft from said first position toward said second position to thereby move said cam means to release said latching means and permit said energy storing means to drive said plunger to its released position.

2. An energy storing and release mechanism in accordance with claim 1 wherein said actuating means comprises a solenoid including a stator and further including a rotor joined to said shaft and operative to rotate said shaft upon energization of said solenoid stator;

3. An energy storing and release mechanism in accordance with claim 2 wherein said locking means includes a detent provided on said rotor and a relatively fixed abutment adjacent said rotor and engageable with said detent to retain said shaft in said first position, and further wherein the energization of said solenoid sequentially releases said detent from said abutment and rotates said rotor to move said shaft from said first position toward said second position.

4. An energy-storing and release mechanism comprising:
    a plunger movable from an energy-storing cocked position to a released position;
    energy-storing means operable to move said plunger from said cocked to said released position;
    latching means engageable with said plunger to releasably retain said plunger in said cocked position;
    a longitudinally movable shaft mounted adjacent said plunger and rotatable between selected first and second positions;
    cam means joined to said shaft and operable in a latched position to releasably retain said latching means in engagement with said plunger with said shaft in said first position and further operable to release said latching means as said shaft rotates toward said second position;
    a solenoid comprising a rotor joined to said shaft and a stator separated from said rotor by a predetermined air gap, said solenoid being arranged so that energization of said stator reduces said air gap by attracting said rotor toward said stator and thereby shifts said shaft longitudinally and further rotates said rotor and shaft; and
    shaft locking means to releasably lock said shaft in said first position comprising a detent provided on said rotor and a relatively fixed abutment adjacent said rotor and arranged to engage said detent with said shaft in said first position and to disengage from said detent as the energization of said solenoid stator shifts said shaft and the associated rotor and detent longitudinally a selected distance, whereby said locking means precludes the accidental rotation of said rotor and shaft before energization of said solenoid.

5. An energy storing and release mechanism in accordance with claim 4 including biasing means forcefully urging said shaft longitudinally in a selected direction to maintain said air gap and releasably retain said detent engaged with said abutment.

6. An energy storing and release mechanism in accordance with claim 4 wherein said cam means and latching means are arranged to retain said latching means in engagement with said plunger as said shaft is shifted longitudinally in response to the energization of said solenoid, to thereby prevent premature release of said plunger.

7. An energy-storing and release mechanism in accordance with claim 6 wherein said cam means comprises a planetary cam means including an arcuate cam surface joined to said shaft and spaced adjacent said locking means and a planetary rolling cam engaged with said cam surface and movable thereon between a latched position engaged with said latching means and a released position which permits said energy-storing means to drive said plunger to its released position; and
    connecting means joining said planetary cam means to said shaft and operable to move said rolling cam from said latched to said released position in response to a selected rotation of said shaft, to thereby release said plunger.

8. An energy-storing and release mechanism in accordance with claim 7 wherein said connecting means comprises a cam nut fixed to said shaft and a cam spider movably mounted about said shaft in engagement with said rolling cam and wherein said cam nut and spider are connected by a tongue and groove connection so that said spider transmits the rotation of said cam nut to said rolling cam.

9. The invention in accordance with claim 8 wherein said cam nut and spider are longitudinally shiftable with respect to each other without uncoupling said connection therebetween and further wherein said mechanism includes means to retain said rolling cam engaged with said latching means as said shaft shifts longitudinally in response to the energization of said solenoid.

10. The invention wherein said retaining means comprises in accordance with claim 9 biasing means engaged between said spider and cam nut and operable to urge said spider longitudinally into a selected position which thereby retains said rolling cam engaged with said latching means as said shaft and cam nut shift longitudinally in response to the energization of said solenoid.

* * * * *